*Boon & Collins,*

*Wood Molding Machine.*

N° 43,001. Patented June 7, 1864.

Witnesses:
Franklin Regard
Lores Baker

Inventors:
Boon & Collins
By their Attorney
Gilbert B. Fowler

UNITED STATES PATENT OFFICE.

ALONZO T. BOON AND JOHN COLLINS, OF GALESBURG, ILLINOIS.

IMPROVEMENT IN PLANING-MACHINES.

Specification forming part of Letters Patent No. 43,001, dated June 7, 1864.

*To all whom it may concern:*

Be it known that we, ALONZO T. BOON and JOHN COLLINS, of the city of Galesburg, in the county of Knox, in the State of Illinois, have invented a new and useful Machine for Planing, Cornering, Boring, and Sawing; and we do hereby declare that the following is a full, clear, and exact description thereof, reference being had to the annexed drawings, and to the letters of reference marked thereon.

Figure 1:
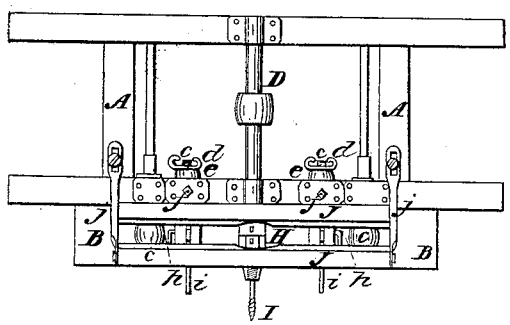
Figure 2:
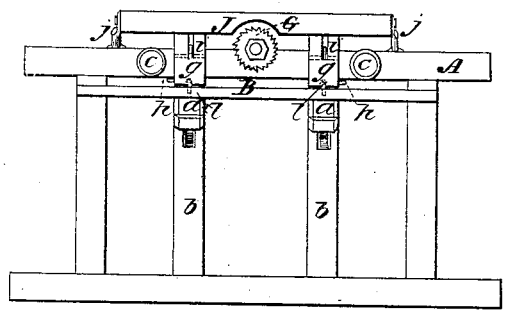
Figure 3:
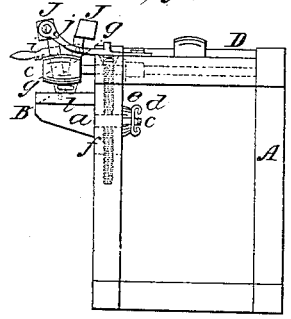
Figure 4:
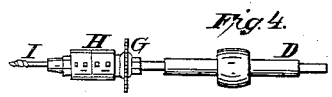

Figure 1 is a plan or top view of our machine; Fig. 2, a side view; Fig. 3, an end view; Fig. 4, a view of the driving-shaft, detached from the machine, showing the arrangement of the boring-bit, planing-knife, and circular saw combined.

Like letters indicate like parts in all figures of the drawings.

The nature of our invention has reference to an arrangement and combination of the boring-bit, planing-knife, and circular saw on one end of the driving-shaft in the machine, whereby the functions of boring, planing, sawing, and cornering is done, the latter being performed by means of adjustable jaws or gage-bars resting upon an adjustable table, both of which are essential features in our improved machine, and which will be hereinafter described more particularly.

To enable any one skilled in the art to make and use our invention, we will proceed to describe its construction and operation.

We construct a frame, A, nearly square in appearance and of a suitable size, all of its parts being secured in a substantial manner. On one side, to the left and nearly the length and near the top of the frame, is a table, B, supported by two braces, *a a*, as seen in Figs. 2 and 3, each of which is directly opposite and flush with the two inner uprights, *b b*, of the frame. The table by means of the braces is held and kept to any desired place on the side of the frame by screws *c*, nuts *d*, and washers *e*. The screws pass through slots in the uprights, and are made fast to the braces. The table to accommodate the board or other wooden material to be operated on is raised and lowered according to the thickness of same in its relation to the feed rollers C C. The vertical screws *f f*, as seen in Fig. 3 in dotted lines, are inserted in the uprights from the top of the frame, and pass down through the cross-screws for the purpose of steadying the table, the cross-screws embracing them in a sufficiently loose manner as to admit of their sliding easily up and down. The driving-shaft D is placed about the center and on top of the frame. On the end over the table is placed the circular saw G and planing-knife H, both of which are screwed on and are made secure by nuts and washers, or by any well-known mechanical means. Screwed onto the extreme end is the boring-bit, as seen in Fig. 4. The result of this arrangement is, when the operator wishes to saw and plane a board, the saw is gaged and set from the side of the frame (which necessarily includes the planing-knife) to suit the width of the material to be sawed. The planing-knife, being on the left, cleans off the rough surface while the operation of sawing is being performed. Either one of the three may be used alone by removing the other two from the shaft; but before the operation of planing and sawing can be done the adjustable jaws or gage-bars J J have to be removed, which are provided for the purpose of holding weather-boarding while it is being straightened, cornering, or otherwise dressing the edges of wooden material. These jaws or gage-bars J J are nearly as long as the table, and project a little above the top of the frame, and are supported by standards *g g* resting on the table. These standards are hinged on the side at or near the bottom by metallic loops *h h*, embracing the two standards, which are placed near the ends to allow a free and easy movement to the jaws. The two outer standards are kept in their proper places on the table by small pins or rods *l l*, inserted under the bottom of each, and then into the table, or by any mode that will keep them in place and allow of their being conveniently removed when desired. Secured to the inner standards, near the top of the jaw or gage, are ratchet-levers *i i*, which pass through slots in the outer ones, as seen in Figs. 2 and 3, and serve to clamp or gage the inner jaw to the outer one at any angle that may be desired, thereby embracing the material in such a manner in its passage over the planing-knife as to enable the operator to control it for cornering or straightening the same. The ends of the outer jaw have braces *j j* secured to them, as seen in Figs. 1 and 3, and extend over to on the top of the frame, and then secured to the same by screws. The outer jaw can be extended from the inner one by loosening the screws, the braces having slots near their ends on the frame to admit of its being done. By removing the screws entirely, the jaws may be removed from the table when desired.

The advantages of this machine will be found to be very useful and convenient to farmers and other persons where the facilities for doing the kind of work above described is not at hand, and where it is not desirable in a pecuniary respect to have their work done at a large factory or shop. Its lightness and simplicity of construction and portability enable them to obtain one at a trifling cost, comparatively speaking; or, if it is found desirable, by purchasing the proper material pertaining to it, one may be readily constructed, and when steam-power is not convenient to drive, it horse or water power may be used, which makes it more advantageous to this class of persons than any other.

Having described our invention, what we claim, and desire to secure by Letters Patent is—

In a machine for planing, sawing, boring, and cornering, the combination of the adjustable side table with the adjustable jaws or gage-bars, as constructed and arranged, when used in combination with the planing-knife, saw, and boring-bit, as arranged on one end of the driving-shaft in the frame, for the purposes above mentioned, and as herein described and set forth.

ALONZO T. BOON.
JOHN COLLINS.

Witnesses:
ZIMRI POND,
ISAAC DELANO.